(12) United States Patent
Hoffman et al.

(10) Patent No.: US 7,751,109 B1
(45) Date of Patent: Jul. 6, 2010

(54) ELECTRO-OPTIC SHUTTER

(75) Inventors: Robert C. Hoffman, Woodstock, VA (US); Timothy Pritchett, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 214 days.

(21) Appl. No.: 11/527,649

(22) Filed: Sep. 14, 2006

(51) Int. Cl.
*G02F 1/03* (2006.01)

(52) U.S. Cl. ..................................................... 359/257

(58) Field of Classification Search ................. 359/257, 359/501, 498, 497, 494, 251, 252, 239, 45, 359/246, 248, 254, 256, 322, 323, 484; 349/120, 349/121, 117, 119, 172, 196
See application file for complete search history.

(56) References Cited

U.S. PATENT DOCUMENTS

| | | | | |
|---|---|---|---|---|
| 3,947,184 A * | 3/1976 | Saeva et al. | ..................... | 349/25 |
| 4,181,899 A * | 1/1980 | Liu | .............................. | 372/22 |
| 4,201,450 A * | 5/1980 | Trapani | ....................... | 359/254 |
| 4,466,703 A | 8/1984 | Nishimoto | | |
| 4,490,739 A | 12/1984 | Himuro et al. | | |
| 4,639,088 A * | 1/1987 | Suginoya et al. | ............. | 349/106 |
| 5,127,019 A * | 6/1992 | Epstein et al. | ............... | 372/108 |
| 5,257,123 A * | 10/1993 | Shingaki et al. | ............... | 349/72 |
| 5,892,559 A * | 4/1999 | Sharp | ........................... | 349/80 |
| 6,141,071 A * | 10/2000 | Sharp | ......................... | 349/121 |
| 6,330,097 B1 * | 12/2001 | Chen et al. | ................... | 359/239 |
| 6,380,997 B1 * | 4/2002 | Sharp et al. | .................. | 349/119 |
| 6,529,304 B1 | 3/2003 | Kimura et al. | | |
| 6,792,175 B2 * | 9/2004 | Feldman et al. | ............... | 385/17 |
| 2002/0009251 A1 | 1/2002 | Byrne et al. | | |
| 2007/0085972 A1* | 4/2007 | Tan et al. | ....................... | 353/20 |
| 2007/0152198 A1* | 7/2007 | Jen et al. | ...................... | 252/582 |

OTHER PUBLICATIONS

Fundamentals of Photonics, by Bahaa E. A. Saleh, et. al, (c) 1991 by John Wiley & Sons, pp. 703-705.

* cited by examiner

*Primary Examiner*—Timothy J Thompson
*Assistant Examiner*—Tuyen Q Tra
(74) *Attorney, Agent, or Firm*—Edward L. Stolarun; Lawrence E. Anderson

(57) ABSTRACT

Various embodiments of an improved electro-optic shutter are disclosed. One embodiment comprises an electro-optic element, first and second polarizers, and a pair of electrodes. The electro-optic element has opposing transverse surfaces and operates as a half wave plate when a voltage $V_\pi$ is applied to the element. The first and second polarizers are each disposed adjacent to one transverse surface of the electro-optic element. The first and second electro-optic element have parallel transmission axes. Each electrode is disposed on one of the transverse surfaces of the electro-optic element and has an electric field which is substantially uniform over the transverse extent of the electro-optic element.

6 Claims, 5 Drawing Sheets

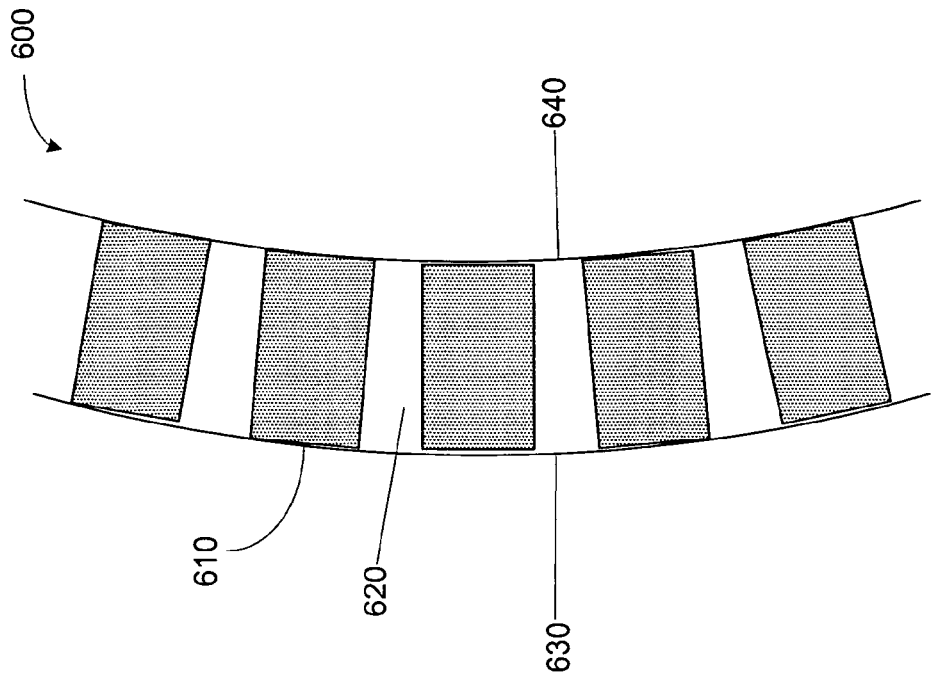
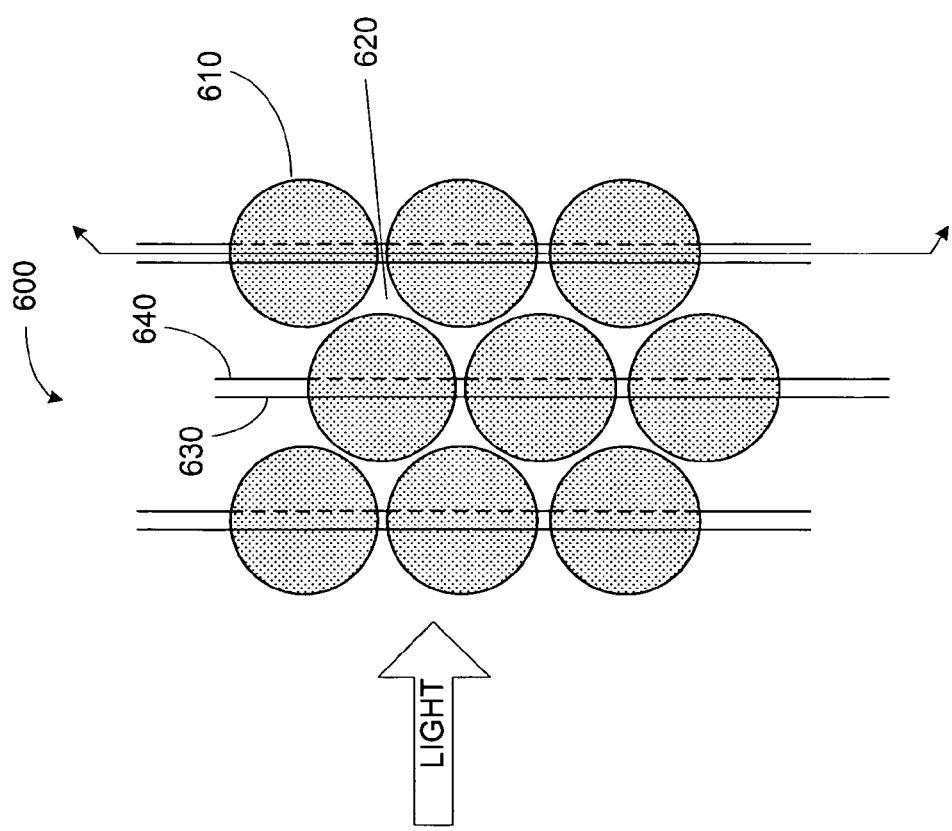

ELECTRO-OPTIC SHUTTER

STATEMENT OF GOVERNMENT INTEREST

The invention described herein may be manufactured, used, and licensed by or for the United States Government.

CROSS REFERENCE TO RELATED APPLICATIONS

Not applicable.

FIELD OF THE INVENTION

The present disclosure relates to electro-optic shutters, and more specifically to a shutter using a Pockels cell.

BACKGROUND

The high intensity light in a laser pulse can damage the human eye to such an extent that permanent blindness occurs. Laser pulses can also damage electronic imaging or sensor devices. Using a shutter device to block a laser pulse is difficult because of the quick transient time of the optical pulse, on the order of milliseconds down to nanoseconds. The short response time makes mechanical shutters unworkable for laser pulses. Chemical dye-based shutters have a faster response time, but do not provide enough attenuation to protect against laser pulses. Electro-optic shutters have a quick response time and good attenuation, but conventional designs do not extinguish light evenly over the extent of the electro-optic element. Therefore, an improved electro-optic shutter is needed.

SUMMARY

The invention is summarized in an electro-optic shutter including: an electro-optic element; a first polarizer; a second polarizer; and a pair of electrodes. The electro-optic element operates as a half wave plate when a voltage $V_\pi$ is applied to the element, and has two opposing transverse surfaces. The first polarizer is disposed adjacent to one transverse surface of the electro-optic element and has a first transmission axis. The second polarizer is disposed adjacent to the other transverse surface of the electro-optic element and has a second transmission axis different than the first transmission axis. Each electrode is disposed on one of the transverse surfaces of the electro-optic element and has an electric field which is substantially uniform over the transverse extent of the electro-optic element.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIGS. 6A and 6B are top and side views, respectively, of another embodiment of electro-optic shutter.

DETAILED DESCRIPTION

Figure 1:
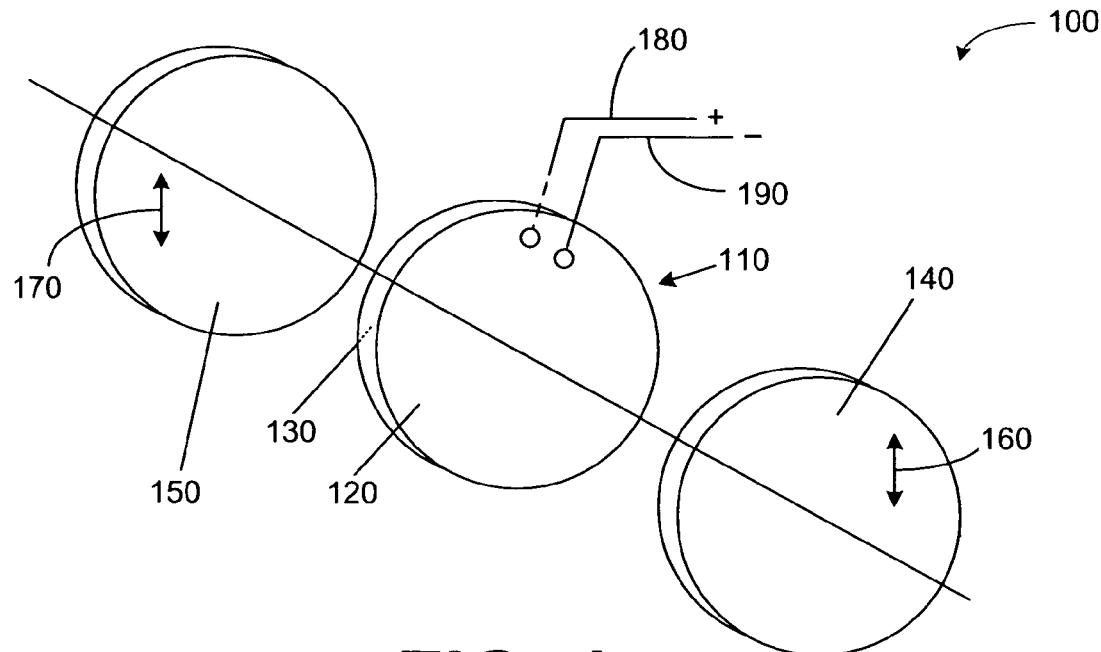
FIG. 1 is an exploded view of one embodiment of an improved electro-optic shutter.

FIG. 1 is an exploded view of one embodiment of an improved electro-optic shutter (100). Shutter 100 includes a Pockels cell (110) having opposing transverse surfaces (120, 130). As should be known to a person of ordinary skill in the art, Pockels cell 110 is an electro-optic element that operates as a voltage-controlled wave plate. When a voltage $V_\pi$ is applied across opposing surfaces 120 and 130, Pockels cell 110 operates as a half-wave plate. Pockels cell 110 may be made of potassium dihydrogen phosphate (KDP), deuterated potassium dihydrogen phosphate (K*DP), or any other inorganic, polymeric, or organic material which exhibits a Pockels effect.

Polarizers (140, 150) are located on either side of Pockels cell 110. Polarizers 140 and 150 are linear polarizers assembled in a parallel configuration. Thus, the transmission axis (160) of polarizer 140 is parallel to the transmission axis (170) of polarizer 150.

Electrodes (180, 190) are located on the transverse surfaces (120, 130) of Pockels cell 110. A voltage source (not shown) applies a voltage between electrodes 180 and 190. Electrodes 180 and 190 are fabricated so that the resulting electric field is substantially uniform over the transverse extent of Pockels cell 110, and so that Pockels cell 110 is substantially transparent to incident images on shutter 100. To this end, electrodes 180 and 190 in the example embodiment of FIG. 1 are each shaped as a mesh, formed of perpendicular rows and column. The spacing of the mesh is on the order of 0.5-1.0 mm, and does not generally obstruct the view through the device. In another embodiment (not shown), electrodes 180 and 190 are formed of parallel columns running in one direction, rather than perpendicular rows and columns. The spacing of these columns is on the order of 0.5-1.0 mm. In yet another embodiment, electrodes 180 and 190 take the form of a deposited, conducting transparent film.

Figure 2:
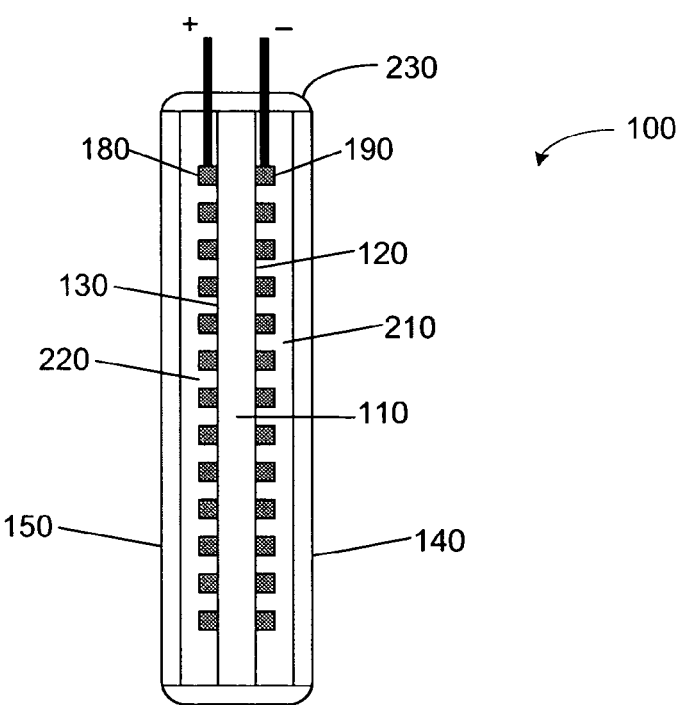
FIG. 2 is a cross section of the shutter of FIG. 1.

FIG. 2 is a cross section of the shutter 100 of FIG. 1. A nonconducting transparent adhesive layer (210, 220) is applied to each of the Pockels cell transverse surfaces (120, 130). In the example embodiment of FIG. 2, electrodes 180 and 190 are free-standing structures, created by electroforming, and each electrode is embedded in one of the adhesive layers 210, 220. In another embodiment (not shown), electrodes 180 and 190 are formed by thin-film Indium Tin Oxide (ITO) deposited directly on the Pockels cell 110, so adhesive layers 210, 220 are unnecessary. A transparent spin-on polymer electrode, such as Baytron®, can also be used. A person of ordinary skill in the art should understand suitable deposition techniques, for example, vacuum deposition.

As described earlier, electroformed electrodes 180 and 190 take the form of perpendicular rows and columns, or of parallel rows. As should be understood by a person of ordinary skill in the art, a spin-on or vacuum deposited electrode will be continuous in coverage. An insulating boundary 230 at the outer edge of shutter 100 prevents voltage from shorting across the outer edge of Pockels cell 110. In one embodiment, the cross section of shutter 100 is on the order of 5 to 10 mm.

Figure 3A:
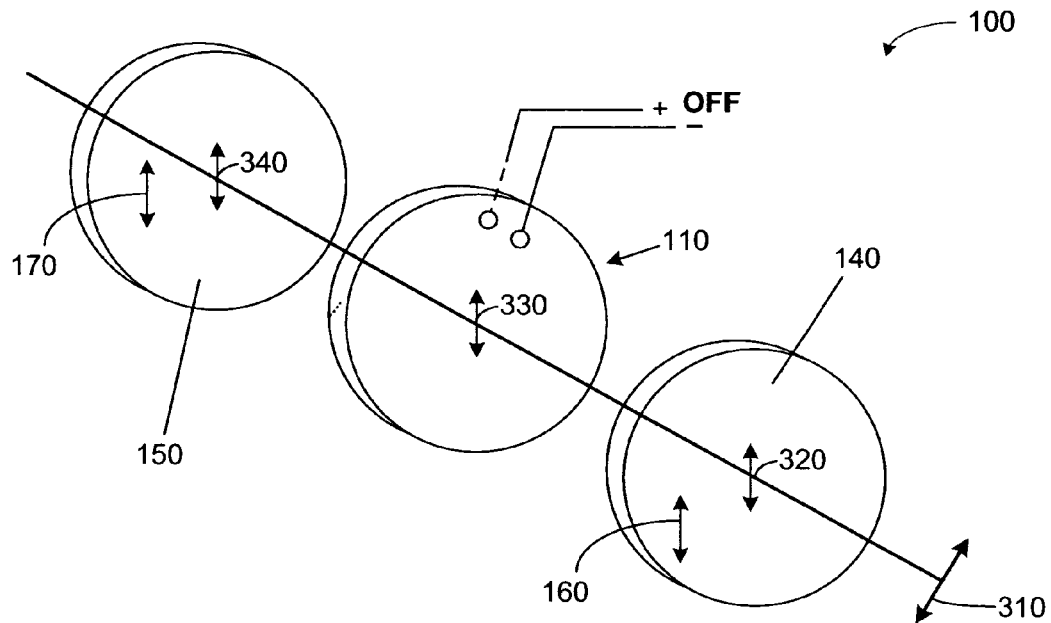
FIGS. 3A and 3B are diagrams of a "normally-off" embodiment of the improved electro-optic shutter of FIG. 1.
Figure 3B:
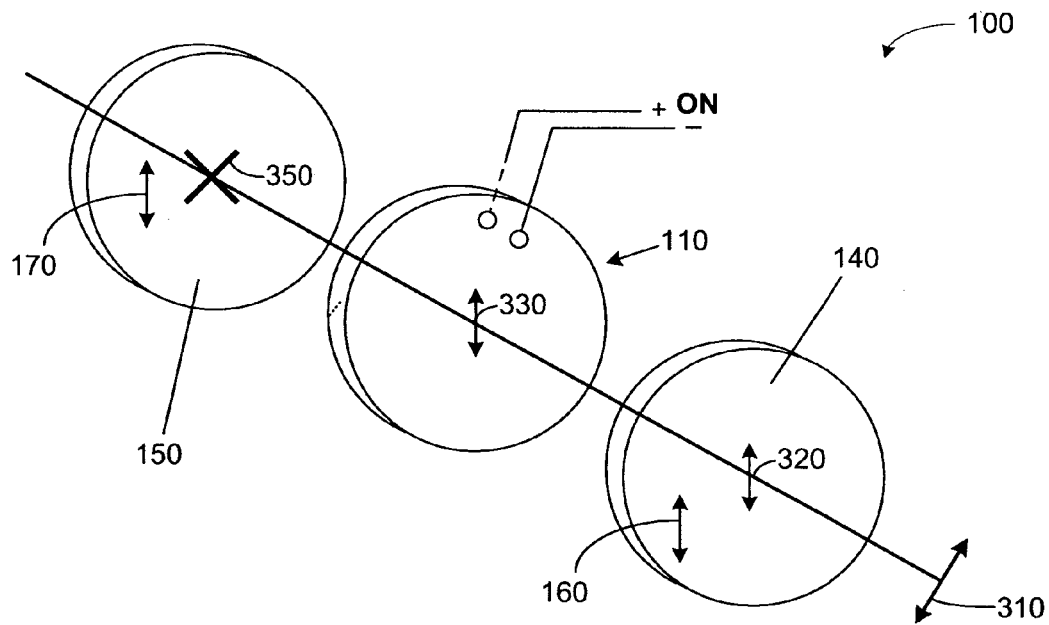

FIGS. 3A and 3B are diagrams of a "normally-off" embodiment of improved electro-optic shutter. FIG. 3A illustrates transmission of light when no voltage is applied to electrodes 180 and 190. FIG. 3B illustrates blocking of light when voltage is applied.

In FIG. 3A, incident light (310) enters shutter 100 through linear polarizer 140. Linear polarizer 140 has a polarization transmission axis (160), so that light (320) exiting linear polarizer 140 is linearly polarized parallel to the transmission axis 160. As should be understood by a person of ordinary skill in the art, polarizer 140 transmits only the light component having a polarization parallel to the transmission axis 160. For ease of illustration, transmission axis 160 is vertical in the example shown in FIG. 3, but transmission axis 160 may be in any direction.

A person of ordinary skill in the art should also understand that polarizer 140 causes some degree of attenuation. The intensity of light (320) exiting polarizer 140 is related to the angle θ between the polarization vector of the incoming light (310) and the transmission axis 160, according to Malus' law:

$$I_{out}=I_{in}\cos^2\theta$$

FIG. 3A illustrates operation when no voltage is applied to electrodes 180 and 190. As should be understood to a person of ordinary skill in the art, when no voltage is applied to Pockels cell 110, the intensity of light exiting polarizer 150 and passing through the cell is unchanged, relative to the intensity of light exiting polarizer 140; that is, when no voltage is applied to Pockels cell 110, the light experiences no attenuation. Light (330) exiting Pockels cell 110 thus has the same linear polarization as does light 320 exiting first linear polarizer 140.

Light 330 enters the second linear polarizer 150, which has a transmission axis (170) that is parallel to the transmission axis 160 of first linear polarizer 140. Because the transmission axes are parallel, light (340) exits second linear polarizer 150 substantially unchanged, except for some degree of attenuation as described by Malus' law.

FIG. 3B illustrates operation of a normally-off improved electro-optic shutter when voltage $V_\pi$ is applied to electrodes 180 and 190. As described earlier, linear polarizer 140 causes light (320) entering Pockels cell 110 to be linearly polarized in the direction of axis 160. When voltage $V_\pi$ is applied to electrodes 180 and 190, Pockels cell 110 acts as a half-wave plate, retarding one polarization component by 90° relative to the other, so that the light remains linearly polarized, but with the axis of polarization rotated 90°. Light (350) exiting Pockels cell 110 therefore has a polarization vector that is 90° from the polarization vector (170) of second linear polarizer 150, and second linear polarizer 150 blocks light 350.

The configuration of electrodes 180 and 190 is such that the electric field resulting from voltage $V_\pi$ is substantially uniform over the transverse extent of Pockels cell 110, so that rotation of polarization occurs for substantially all of light passing through Pockels cell 110. However, a person of ordinary skill in the art should understand that some amount of light will be transmitted through improved electro-optic shutter, where the amount depends on the extinction available from the crossed polarizers and on how quickly the device begins to block light.

In alternative embodiment, improved electro-optic shutter is "normally on". That is, light is blocked by improved electro-optic shutter unless voltage $V_\pi$ is applied to electrodes 180 and 190. In this normally-on configuration, the two linear polarizers have perpendicular, rather than parallel, transmission axes. Pockels cell 110 rotates the axis of polarization 90° as long as voltage $V_\pi$ is applied to electrodes 180 and 190. Light exiting Pockels cell 110 has a polarization vector parallel to the second linear polarizer (since the second polarizer has a transmission axis 90° to the first polarizer), and therefore passes through the second linear polarizer.

The normally-off configuration provides for a transparent shutter if the power fails, which may be desirable for some applications. The normally-on configuration, which provides for a blocked shutter if the power fails, offers features which may be desirable for other applications. The normally-off configuration uses less power compared to the normally-on configuration, and field uniformity is not an issue.

The electro-optic effect of Pockels cell 110 will now be described in more detail. Pockels cell 110 exhibits a linear electro-optic effect such that birefringence occurs when the cell is placed in an electric field. The induced birefringence is proportional to the applied electric field. The induced birefringence is due to the deformation of the indicatrix (index ellipsoid) caused by the applied field. In order to describe how the indicatrix changes in the presence of an electric field, it is first desirable to define a reciprocal dielectric tensor:

$$\underline{\kappa}=\in_0\cdot(\underline{\in}_r^{-1}) \quad \text{(Equation 1)}$$

where $\in_0$ is the permittivity of free space and $\underline{\in}_r$ is the relative dielectric permittivity tensor. Note that underlined boldfaced symbols denote tensors ($\underline{\kappa}$, $\underline{r}$, $\underline{\in}_r^{-1}$) the boldface symbols denote vector quantities (E), whereas regular type denotes a scalar quantity ($n_o$, n, x, y, z). The indicatrix in the coordinate system of the principal dielectric axes is then defined as shown in Equation 2:

$$(x^2/n_x^2)+(y^2/n_y^2)+(z^2/n_z^2)=1 \quad \text{(Equation 2)}$$

Equation 3 describes the normalized indicatrix without an external electric field applied:

$$x\cdot\underline{\kappa}\cdot x=1 \quad \text{(Equation 3)}$$

When a strong external electric field E is applied, the indicatrix is distorted; the length of the principal axes is modified and the orientation of the indicatrix is also modified:

$$\underline{\kappa}'=\underline{\kappa}+\underline{r}\cdot E \quad \text{(Equation 4)}$$

where r is the Pockels electro-optic tensor. The indicatrix is renormalized to the new field:

$$x\cdot\underline{\kappa}'\cdot x=1 \quad \text{(Equation 5)}$$

The sum of the changes in κ due to the external field can then be written as:

$$\Delta\underline{\kappa}=\underline{r}\cdot E \quad \text{(Equation 6)}$$

The expanded form of Equation 6 for a tetragonal group $\bar{4}2$m crystal (using Hermann-Mauguin notation) includes KDP and its isomorphs. The Pockels electro-optic tensor is a third-rank tensor and contains 18 terms:

$$\begin{pmatrix}(\Delta k)_1\\(\Delta k)_2\\(\Delta k)_3\\(\Delta k)_4\\(\Delta k)_5\\(\Delta k)_6\end{pmatrix}=\begin{pmatrix}0&0&0\\0&0&0\\0&0&0\\r_{41}&0&0\\0&r_{41}&0\\0&0&r_{63}\end{pmatrix}\begin{pmatrix}E_x\\E_y\\E_z\end{pmatrix} \quad \text{(Equation 7)}$$

Under the influence of an applied electric field the equation for the new index ellipsoid is:

$$x^2/n_o^2+y^2/n_o^2+z^2/n_e^2+2r_{41}E_xyz+2r_{41}E_yxz+2r_{63}E_zxy=1 \quad \text{(Equation 8)}$$

When transformed to a new set of coordinates, the indicatrix described in Equation 8 becomes:

$$(1/n_o^2-r_{63}E_z)x'^2+(1/n_o^2+r_{63}E_z)y'^2+z'^2/n_e^2=1 \quad \text{(Equation 9)}$$

where $n_o$ and $n_e$ are the refractive indices of the ordinary and extraordinary ray, respectively. In FIG. 1, the orientation of crystal axes in a practical device is shown. In the presence of an applied field, the indicatrix changes and the x and y axes are rotated to x' and y'.

The incident light polarized parallel to x, can be resolved into two orthogonal components parallel to x' and y', oriented 45° to either side of the x-axis of the crystal. The crystal is customarily cut in a z-cut configuration, meaning that the incoming light travels down the z-axis of the crystal. One component x' is advanced by λ/4 and the y' component is delayed by λ/4. The result is a total phase difference of λ/2, which rotates the incoming polarization 90°.

The phase shift Δϕ that occurs if light is passed through the crystal in the direction of the applied electric field can also be written as:

$$\Delta\phi = 2\pi n_0^3 r_{63} V/\lambda_0 \quad \text{(Equation 10)}$$

where Δϕ is the phase shift (in radians) of the light of wavelength $\lambda_0$ (units of m); $n_0$ is the refractive index (dimensionless quantity) of the Pockels medium at wavelength (units of m); $r_{63}$ is the particular electro-optic constant for the Pockels material (units of m/V); and V is the applied voltage (units of V). The "half wave" voltage $V_\pi$, follows $$V_\pi = \lambda_0 / 2 r_{63} n_0^3 \quad \text{(Equation 11)}$$

This voltage $V_\pi$ is on the order of several kilovolts in a practical device and scales in a linear fashion with wavelength. For KDP, $r_{63}$=10.3 pm/V and $V_\pi$=7.65 KV (λ=546 nm). For KD*P, $r_{63}$=25 pm/V, $V_\pi$=2.98 KV (λ=546 nm). A preferred embodiment uses KD*P, but the use of KDP is also contemplated.

Figure 4:
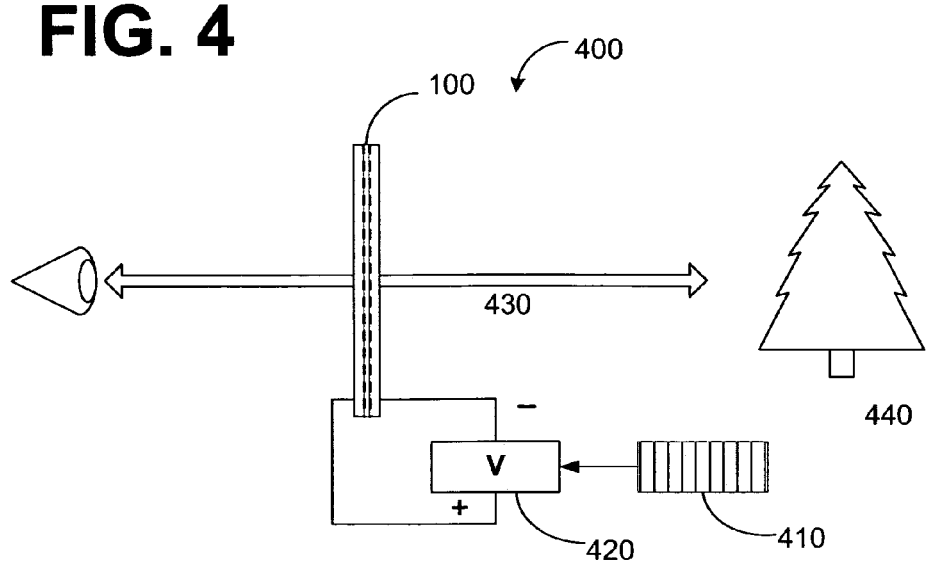
FIG. 4 is a side view (not to scale) of a direct-view device using an improved electro-optic shutter.

FIG. 4 is a side view (not to scale) of a direct-view device using improved electro-optic shutter. Goggles, glasses, and spectacles are examples of such a device. Device 400 includes shutter 100, a plurality of photodetectors 410, and voltage source 420. Shutter 100 is aligned along optical axis 430. When shutter 100 is open, an image of object 440 is formed by in a viewer's eye. The view through shutter 100 may be obstructed to some degree, since electrodes 180 and 190 may be grid-shaped and not transparent. However, the grid of electrodes 180 and 190 is relatively fine compared to the size of shutter 100, so the electrodes do not interfere with a user's view of object 440.

Each photodetector 410 is configured to detect light in a particular range of wavelengths (λ). In one embodiment, the plurality of photodetectors 410 is a series of photodiodes designed to trigger over a specific bandwidth (e.g., 100 nm) but a person of ordinary skill in the art should understand that other photodetector embodiments are also contemplated. Each photodetector 410 is coupled to voltage source 420 in such a manner that detection of light by that detector 410 triggers voltage source 420 to produce a voltage pulse at voltage $V_\pi$, which scales linearly with the wavelength λ. The voltage pulse is supplied to Pockels cell 110. A person of ordinary skill in the art should understand that the shape and duration, and rise time of the pulse can be designed to match the electro-optical characteristics of Pockels cell 110 within shutter 100. In one embodiment, the width of the voltage pulse is on the order of picoseconds. For a Pockels cell using KDP or K*DP, the amount of voltage for $V_\pi$ is on the order of several kilovolts, and varies by about 5% from 700-400 nm.

The behavior of shutter 100 in the presence and absence of voltage was described earlier in connection with FIGS. 1, 3A and 3B, and will not be repeated here. The design of device 400 allows very rapid blocking of an optical transient, such as laser pulses in the millisecond to the nanosecond regime. Shutter 100 offers a significant advantage in speed over mechanical shutters, while providing for higher attenuation than passive dye-based shutters.

Figure 5:
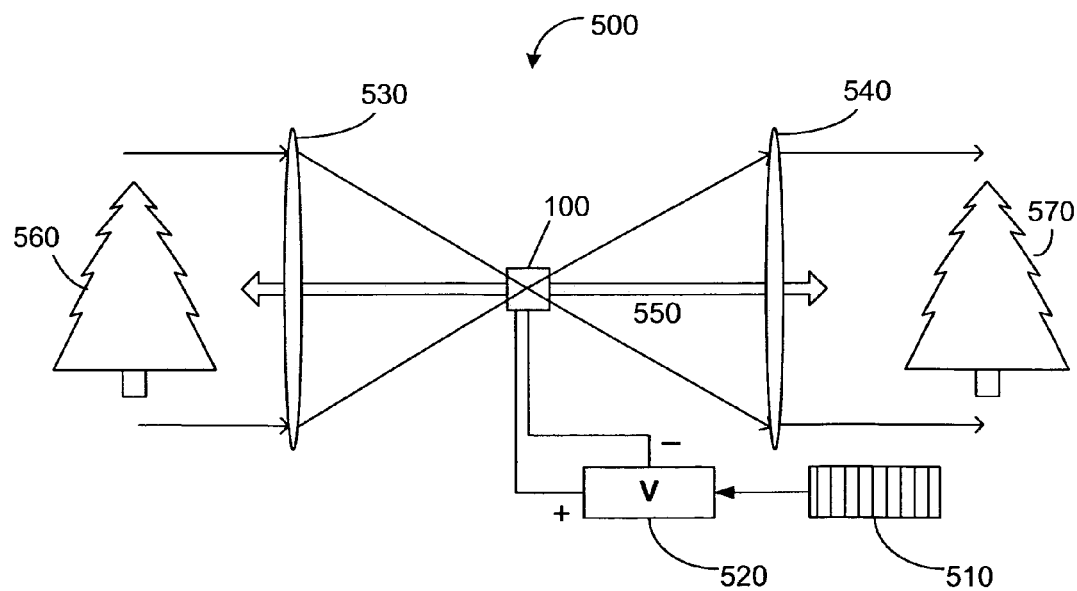
FIG. 5 is a side view (not to scale) of a focal-plane device using an improved electro-optic shutter.

FIG. 5 is a side view (not to scale) of a focal-plane device using improved electro-optic shutter. Cameras, binoculars, and other imaging devices are examples of such a device. Device 500 includes a plurality of photodetectors 510 and voltage source 520, the operation of which was described earlier in connection with the direct-view device of FIG. 4. Device 500 also includes optical components: a focusing lens 530, shutter 100, and a recollimating lens 540. In one embodiment, shutter 100 comprises a single Pockels cell (a "pixel"). The optical components are aligned along optical axis 550. As should be understood by a person of ordinary skill in the art, the focusing lens 530 focuses light from an object 560 onto shutter 100, forming a "real" image (not shown). When shutter 100 is open, light passes through shutter 100 and virtual image 570 can be seen through recollimating lens 540. When shutter 100 is closed, no image is seen at recollimating lens 540. This embodiment allows a smaller single Pockels cell element to control viewing of an entire image.

FIGS. 6A and 6B are top and side views, respectively, of another embodiment of electro-optic shutter 600. This embodiment uses an array of Pockels cells. Individual Pockels cells 610 are arranged in proximity and separated by a flexible insulating material 620. In one embodiment, insulating material 620 is a moldable polymer. Electrodes 630 and 640 deliver voltage to each face of one of the Pockels cells 610. In the embodiment shown in FIG. 6, all Pockels cells 610 are connected in parallel. In another embodiment (not shown), each of the Pockels cells 610 may be activated by its own series of photodetectors.

The use of discrete cells in proximity and embedded within a flexible material allows shutter 600 to be constructed in a segmented fashion, so that the overall device configuration can follow a curved surface. In the example embodiment of FIGS. 6A and 6B, Pockels cells 610 have a hexagonal arrangement, where each cell is adjacent to six other cells, and the cells are packed tightly. While this arrangement allows high cell density, a person of ordinary skill in the art should understand that other spatial arrangements are possible.

Figure 7:
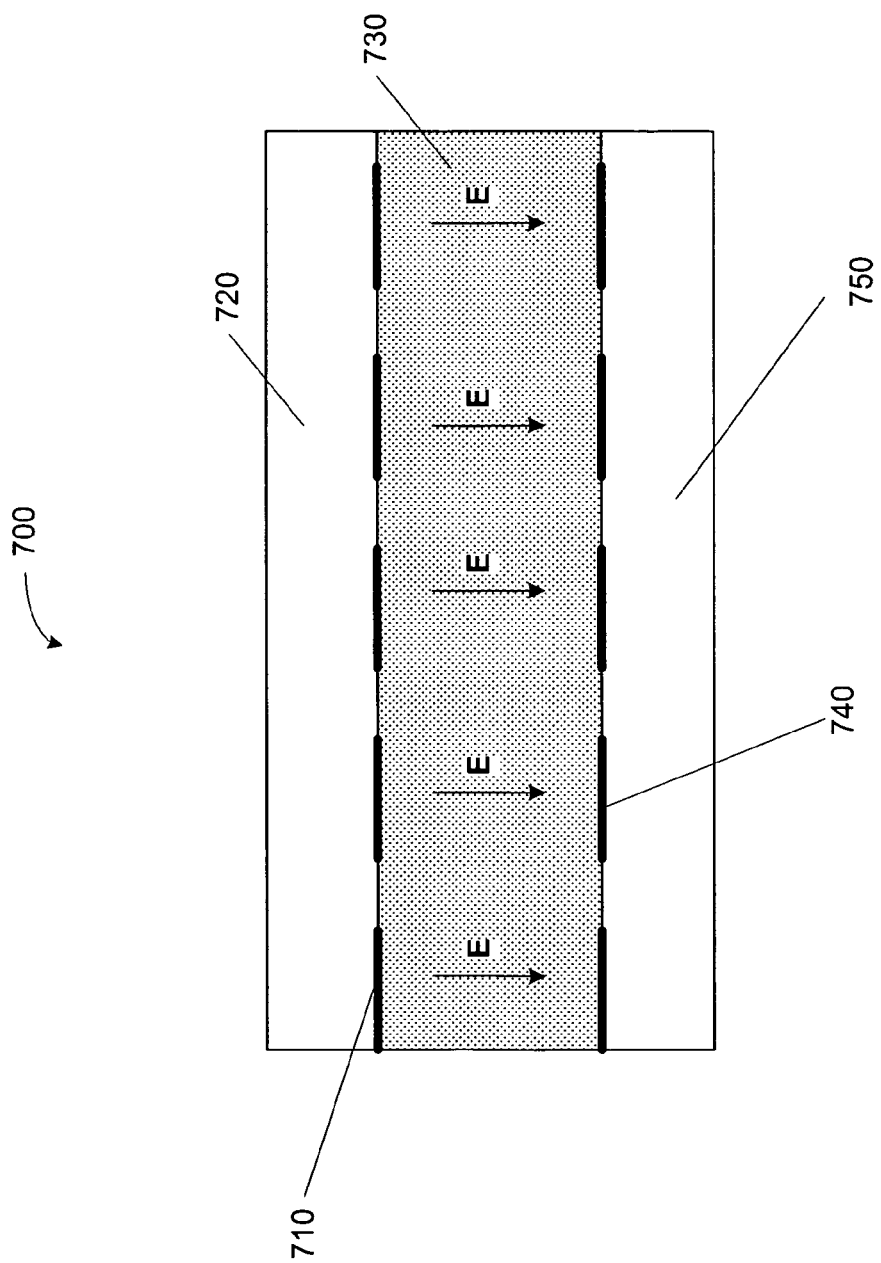
FIG. 7 is a cross section of yet another embodiment of an improved electro-optic shutter.

FIG. 7 is a cross section of another embodiment of an improved electro-optic shutter (700). In this embodiment, a series of thin-film transparent electrodes 710, having the same polarity, are deposited in a first pattern onto a first polarizer plate 720. Polymeric Pockels cell film 730 is formed on polarizer plate 720 by spin casting. A series of thin-film transparent electrodes 740, of the opposite polarity, are deposited in a corresponding pattern on a second polarizer plate 750. Second polarizer 750 and Pockels cell film 730 are thermally bonded together. The resulting assembly (700) is heated and/or bonded to form a conformable flexible large area Pockels cell that is on the order of a few millimeters in thickness. In one embodiment, Pockels cell film 730 has an E-O coefficient of at least 300 pm/V. In one embodiment, the film is a spin-cast cross-linked dendrimer (CLD).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

We claim:

1. An electro-optic shutter comprising:
    an electro-optic element operating as a half wave plate when a voltage $V_\pi$ is applied to the element, the electro-optic element having opposing transverse surfaces;
    a first polarizer disposed adjacent to one transverse surface of the electro-optic element and having a first transmission axis;
    a second polarizer disposed adjacent to the other transverse surface of the electro-optic element and having a second transmission axis different than the first transmission axis; and
    a first pair of grid electrodes comprising a first plurality of thin-film transparent electrodes deposited in a first pattern onto the first polarizer, each electrode disposed on one of the transverse surfaces of the electro-optic element and having an electric field which is substantially uniform over the transverse extent of the electro-optic element; the electro-optic element having a first state in which light is transmitted therethrough substantially unchanged such that light exiting the first polarizer will be blocked by the second polarizer, and a second state in which substantially all of the light passing therethrough experiences a rotation of polarization of ninety degrees so as to substantially coincide with the transmission axis of the second polarizer so as to allow passage of light therethrough,
    wherein the electro-optic element is a polymeric Pockels cell film formed on the first polarizer by spin casting, and
    a second pair of grid electrodes comprising a second plurality of thin-film transparent electrodes deposited on the second polarizer in a corresponding second pattern, and the second polarizer and the Pockels cell film are thermally bonded together.

2. A direct-view optic device comprising:
    a plurality of photodetectors, each photodetector configured to detect light in a particular range of wavelengths $\lambda$;
    a voltage source coupled to each of the photodectors so that detection of light by the corresponding photodetector produces a voltage pulse at voltage $V_\pi$; and
    an electro-optic shutter comprising:
    an electro-optic element operating as a half wave plate when the voltage $V_\pi$ from the voltage source is applied to the element, the electro-optic element having opposing transverse surfaces;
    a first polarizer disposed adjacent to one transverse surface of the electro-optic element and having a first transmission axis;
    a second polarizer disposed adjacent to the other transverse surface of the electro-optic element and having a second transmission axis parallel to the first transmission axis; and
    a pair of grid electrodes, each electrode disposed on one of the transverse surfaces of the electro-optic element.

3. The device of claim 2, wherein the electro-optic element is a Pockels cell containing potassium dihydrogen phosphate (KDP) or deuterated potassium dihydrogen phosphate (K*DP).

4. The device of claim 2, wherein at least one of the electrodes is an electroformed mesh of perpendicular rows and columns.

5. The device of claim 2, wherein at least one of the grid electrodes is an electroformed mesh of parallel rows and columns.

6. The device of claim 2, wherein at least one of the electrodes is thin-film Indium Tin Oxide (ITO) deposited directly on the electro-optic element.

* * * * *